(No Model.)
H. P. BROOKS.
BOTTLE STOPPER FASTENING.
No. 334,100. Patented Jan. 12, 1886.
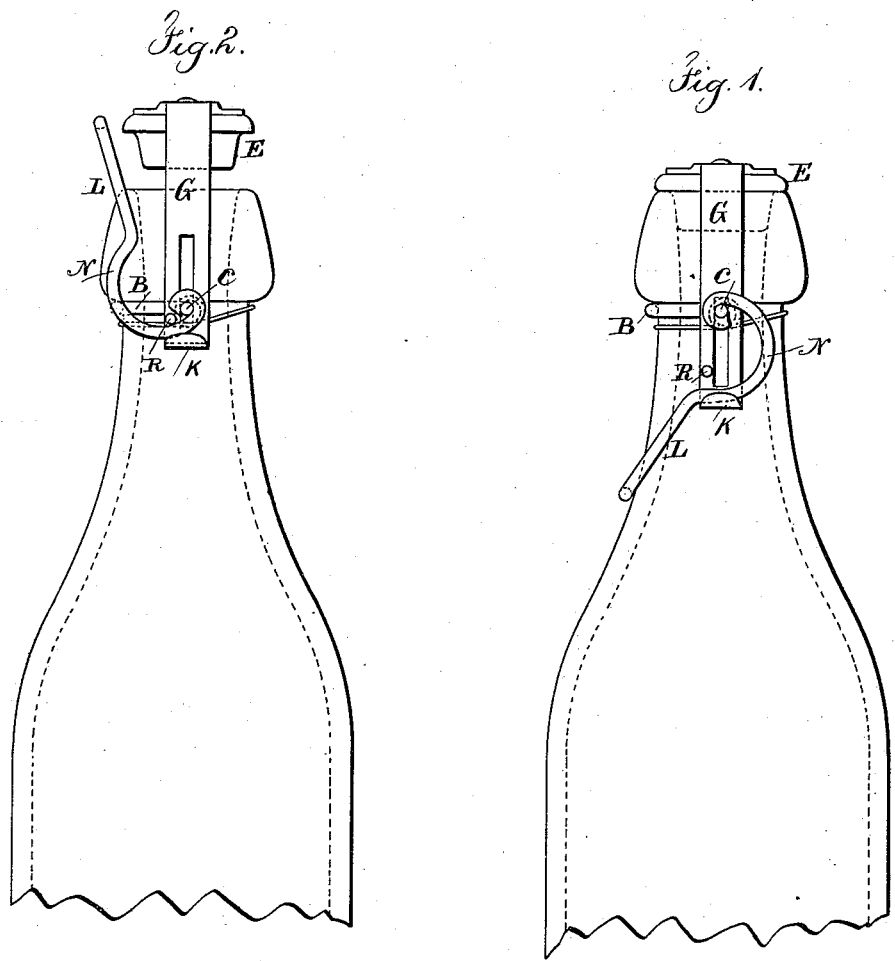
Witnesses
Chas H. Smith
J. Stait
Inventor
Heman P. Brooks
per Lemuel W. Serrell
Atty

UNITED STATES PATENT OFFICE.

HEMAN P. BROOKS, OF BROOKLYN, NEW YORK, ASSIGNOR TO HIMSELF AND JAMES L. CARSON, OF TORRINGTON, CONNECTICUT.

BOTTLE-STOPPER FASTENING.

SPECIFICATION forming part of Letters Patent No. 334,100, dated January 12, 1886.

Application filed June 4, 1885. Serial No. 167,588. (No model.)

*To all whom it may concern:*

Be it known that I, HEMAN P. BROOKS, of Brooklyn, in the county of Kings and State of New York, have invented an Improvement in Bottle-Stopper Fastenings, of which the following is a specification.

This invention is an improvement on that set forth in my application No. 157,546, filed March 2, 1885, and allowed March 17, 1885.

In the drawings, Figure 1 is a side view with the stopper closed, and Fig. 2 is a similar view with the stopper open.

In the said application a bottle-stopper, E, is represented as provided with a bail, G, slotted near the ends, through which slots pass the ends of the neck-band wire B, and there is a lever, L, having two arms, the ends of which are bent up to form eyes that surround the projecting ends $c$ of the neck-band wire B, and these ends $c$ become pivots, upon which the lever L is swung, and the cam-shaped portions N of the lever L act against the feet-pieces $k$ of the bail G to force said bail downwardly.

In the device set forth in my aforesaid application the stopper and bail require to be moved by hand separately from the lever L, and for this reason the stopper is not as easily handled as desired.

My present improvement is made for causing the lever L to raise the bail and draw the stopper in opening the bottle, and then to swing the bail and stopper aside from over the mouth of the bottle by a continuation of the movement of the lever. To effect this object I provide upon the bail G projecting studs R, passing out over the cam-shaped portions N of the lever L, so that the wire of the lever passes between such studs R and the feet K; hence, when the stopper is swung up over the bottle-neck and the lever L pressed down, the same acts against the feet K at the lower ends of the bail G to draw down such bail G and close the stopper with a powerful movement, but when the lever L is raised the upper surfaces of the cam-shaped portion N act beneath the studs R to raise the bail G and stopper E bodily and open the mouth of the bottle, and a further movement of the lever L causes the bail G to swing upon the pivot C and move with the lever L in turning the parts aside from the end of the bottle. In this manner the bottle is opened completely by one movement of the lever L, and by the reverse movement the stopper and bail are brought up into place for the stopper to be guided into the mouth of the bottle and pressed down to place, as aforesaid.

The studs R preferably project directly from the bail G; but such projections may be formed in any desired manner, the lever passing in between the feet and the projections.

I claim as my invention—

The combination, with the neck-band B and lever L, pivoted upon the neck-band, of the stopper E, slotted bail G, the pivots $c$, passing through said slots, the feet K, against which the lever L acts in closing the stopper, and the studs or projections R upon the bail G above the cam-shaped portions of the lever L, substantially as and for purposes set forth.

Signed by me this 1st day of June, A. D. 1885.

HEMAN P. BROOKS.

Witnesses:
GEO. T. PINCKNEY,
WILLIAM G. MOTT.